Oct. 8, 1963
R. H. ROSENBERG ETAL
3,106,062
TORQUE AND POWER SENSING AND CONTROL
SYSTEM FOR GAS TURBINE ENGINES
Filed Dec. 18, 1959
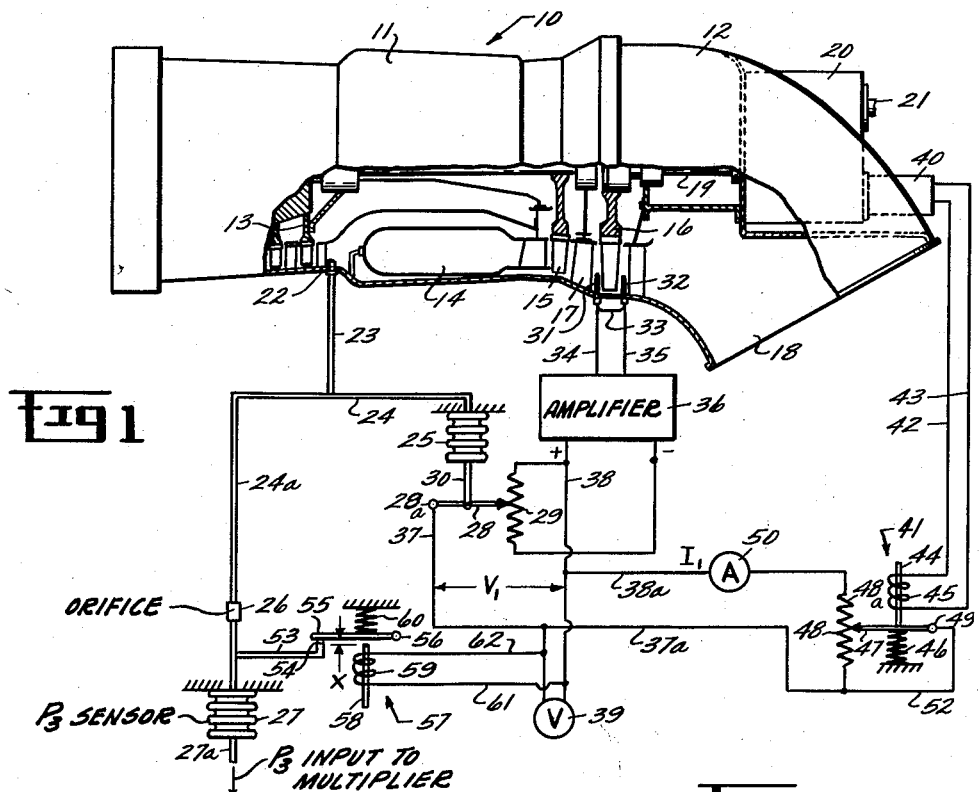
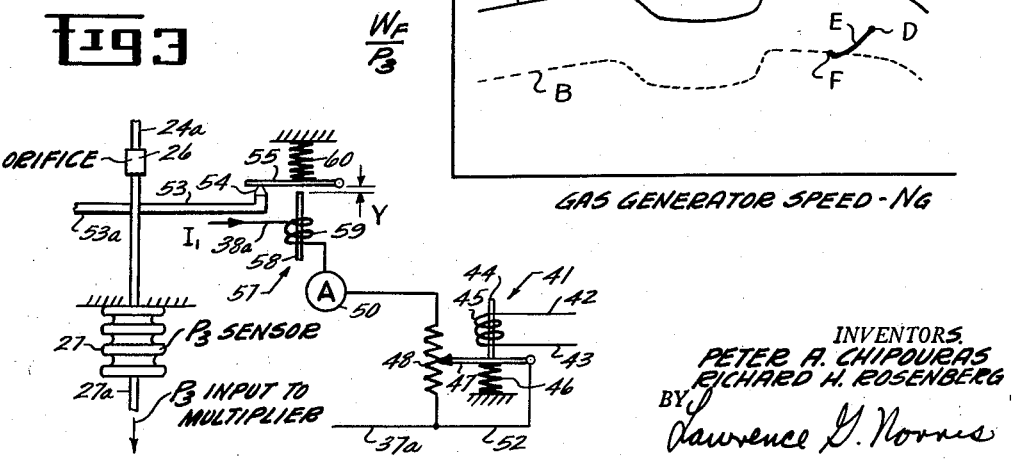
INVENTORS.
PETER A. CHIPOURAS
RICHARD H. ROSENBERG
BY
Lawrence D. Norris
ATTORNEY—

3,106,062
TORQUE AND POWER SENSING AND CONTROL SYSTEM FOR GAS TURBINE ENGINES
Richard Harvey Rosenberg, Stoneham, and Peter Arthur Chipouras, Wakefield, Mass., assignors to General Electric Company, a corporation of New York
Filed Dec. 18, 1959, Ser. No. 860,379
14 Claims. (Cl. 60—39.16)

Our invention relates to a torque and power sensing and control system for gas turbine engines and is particularly applicable to gas turbine engines of the turboshaft or turboprop type wherein the power output from the engine is extracted as a mechanical output rather than in the form of thrust.

In engines of this type, that is engines in which the output power is extracted in mechanical form, there exist a number of different control system philosophies which are considered suitable for the different engine applications. In the case of a turboprop engine, for instance, the control approach generally calls for the pilot or other operator to set a particular desired propeller speed and then manipulate the throttle setting to vary the amount of fuel delivered to the engine. The propeller speed is maintained at the pre-set level over the range of power settings determined by the throttle setting by the propeller pitch control system which senses any deviation in the propeller speed from the pre-set level and automatically adjusts the propeller pitch to maintain the pre-set speed.

In the case of a helicopter engine, on the other hand, it is a common practice to provide a control system which calls for the pilot to set a desired rotor speed, as in the turboprop case, but then allows the power output of the engine to be adjusted by manually controlling the pitch of the rotor blades. In this type of system, the fuel flow rate to the engine is controlled automatically in response to deviations in the rotor speed from the pre-set level, whereas in the typical turboprop system, the fuel flow rate is controlled manually while the pitch is adjusted automatically. The foregoing are merely given as examples and other types of fuel control system approaches are, of course, available for these applications and for applications other than those discussed above.

In many of these applications, it is considered desirable, and in some cases a requirement, to provide, for reasons which will later be explored, a means for monitoring or controlling the output power or torque of the engine. For example, while control systems of the foregoing type generally include automatic limits on fuel flow based on temperature and stall considerations which cannot be exceeded by manual manipulation of the control, the wide range of atmospheric conditions over which such engines generally operate, particularly when coupled with normal manufacturing tolerances on the capability of the engine, produces situations where the maximum permissible torque and power absorption limits of the propeller or rotor system may be exceeded. It is well known, for instance, that in the general case a given gas turbine engine is capable of producing a substantially greater power output at cold day conditions than at hot day conditions at the same altitude. This and other factors which produce a similar effect create a situation which may allow the operator to exceed maximum permissible torque or power limits within the range of control discretion available to him. However, if the conventional temperature and stall limits are lowered to prevent exceeding certain torque or power limits under extreme cold day or equivalent conditions, the performance of the engine is compromised for the various other operating conditions where such additional limitations are not required. The same considerations apply to other types of installations wherein the load driven by the engine, or the mechanical configuration of the engine itself, may impose limitations on the maximum power or torque which can be transmitted.

Thus, it is considered desirable to provide means whereby, in addition to the limits imposed on fuel flow by temperature and stall considerations, the maximum power or torque output of the engine may also be limited or controlled. In one type of approach, this may be accomplished by providing a torque or power sensing and indicating system which allows the pilot to visually monitor the torque or power output of the engine and by proper manipulation of the controls, avoid exceeding the limits. Such an indicating system is also desirable in that it allows the pilot to monitor the torque or power output of the engine over the full range of operating conditions, a capability which is particularly desirable for engine checkout purposes prior to takeoff. Another approach is to provide means for limiting the power or torque output of the engine automatically so that the pilot can not exceed the maximum limits within the range of control discretion provided.

In either approach, it is necessary to extract a signal which is proportional to the torque or power output of the engine, depending on which parameter is to be controlled, and either deliver this signal to an indicating instrument, where manual control is desired, or utilize it as a parameter of an automatic control system in the event the torque or power output is to be controlled automatically.

Presently available torque sensors, which typically may involve strain gages or other arrangements for detecting the torque level in a transmission element or the reaction of a shaft or a gear, generally require access to the output shaft of the engine or the output transmission system. The requirement for access to the engine output shaft or the transmission system creates certain design and installation difficulties. In addition, because such a system relies upon mechanical characteristics of the system such as the torsional characteristics of a shaft or other torque transmitting element, variations in these characteristics with dimensions, material properties, temperature and the like, make it difficult to achieve a consistently high level of accuracy in the output signal.

It is therefore one object of our invention to provide an improved torque or power sensing system for gas turbine engines which does not require access to the rotating parts of the engine or its output transmission system and which may be incorporated into an engine with a minimum of modification of the basic engine and transmission system.

It is another object of our invention to provide an improved torque or power sensing system for gas turbine engines in which the torque or power output of the engine is computed automatically as a function of certain selected engine operating parameters, such as gas flow conditions and speed, and which is not subject to variations in accuracy with changes in the torsional or other characteristics of the output transmission system.

Where it is desired to provide automatic control of the power or torque output of the engine, it is necessary to utilize the power or torque signal as a control parameter of the engine to control the fuel flow to the engine as a function of this parameter.

It is accordingly still another object of our invention to provide an improved control system of the foregoing type for gas turbine engines, in which a signal computed as a function of certain selected engine operating parameters, such as gas flow conditions and speed, and representing the torque or power output of the engine, is utilized as a control parameter of the system to control the torque or power output of the engine within preselected limits.

We accomplish these and other objects of our invention, in one embodiment thereof, by providing, in a gas turbine engine of the type in which the output is extracted in the form of mechanical power, means for producing a signal computed as a continuous function of certain selected engine operating parameters, such as gas flow conditions and speed, and which is proportional to the torque or power output of the engine. In order to derive a signal proportional to engine power output, we extract a signal proportional to the temperature drop across the output turbine of the engine and provide means for automatically and continuously multiplying this signal by a second signal which is proportional to the mass flow rate of gas through the turbine. In the embodiment presented, we utilize, as the mass flow rate signal, a signal proportional to the magnitude of the engine compressor discharge pressure. In order to produce a signal proportional to torque being developed by the output turbine, we provide means for dividing the above-mentioned power signal by a signal proportional to the speed of the output turbine.

In addition we provide a control system which automatically controls the power or torque output of the engine in response to the above-mentioned torque or power signal. In one embodiment of our invention we accomplish this by modifying the magnitude of the compressor discharge signal delivered to the main fuel control of the engine to thereby automatically adjust the fuel flow limits of the control system in response to either a torque or a power signal to achieve torque or power limiting.

Various other objects and advantages of our invention will become apparent from the following description taken in connection with the accompanying drawings in which:

FIG. 1 shows a gas turbine engine of the turboshaft type including a torque and power sensing system together with a power limiting control system embodying our invention, and FIG. 2 is a graphical presentation showing the general characteristic of the combined acceleration and maximum temperature stall limit in terms of fuel flow divided by compressor discharge pressure as a function of the gas generator speed of the engine shown in FIG. 1 and illustrating how this limit characteristic is modified by the control shown in FIG. 1 to achieve torque or power limiting, and FIG. 3 shows a modification of FIG. 1 to achieve a torque limiting function.

Referring now to FIG. 1 there is shown a gas turbine engine 10 of the turboshaft type having a gas generator section 11 and a free power turbine output section 12. The gas generator section 11 comprises an axial flow compressor 13, a combustion chamber 14, and a gas generator turbine 15 which drives the compressor 13. The gases discharged from the gas generator turbine 15 are directed to a free power turbine 16 through an interstage diaphragm 17. After passing through the power turbine 16 the gases are discharged from the engine through an exhaust casing 18.

The power turbine 16 is connected to drive a load through its output shaft 19, gear box 20, and gear box output shaft 21. A pressure pickup probe 22 is mounted in the engine casing to project into the fluid stream in the vicinity of the discharge of the compressor 13. The probe 22 may be mounted to sense either total or static pressure or a combination of both. The compressor discharge pressure is ducted through conduits 23 and 24 to a bellows 25 and through conduits 23 and 24a through a series orifice 26 to a bellows 27 which is the compressor discharge sensing bellows for the main fuel control system of the engine. The main fuel control of the engine is in this case of a well known type in which the output of the pressure sensing bellows 27 is delivered to a multiplier wherein it is multiplied by a signal proportional to the desired fuel flow divided by the compressor discharge pressure. Thus the fuel flow delivered to the engine is determined by the product of the output signal of the bellows 27 and a computed signal proportional to the desired fuel flow rate divided by the compressor discharge pressure. Fuel control systems of this general type are shown and described in U.S. Patents 2,854,818—Fortmann et al. and 2,857,741—Evers.

The bellows 25 controls the position of a potentiometer wiper arm 28 along a resistor 29. The wiper arm 28 is pivotally mounted at 28a and connected to the bellows 25 through a linkage element 30.

Thermocouples 31 and 32 are mounted on either side of the power output turbine 16 as shown. The thermocouples 31 and 32 are electrically interconnected by leads 33, 34 and 35, such that the net output voltage appearing at the leads 34 and 35 is proportional to the difference between the two temperatures sensed by the thermocouples. The output signal of the thermocouples 31 and 32 appearing at leads 34 and 35 and representing the temperature drop across the turbine 16 is connected to an amplifier 36. The output of the amplifier 36 is connected across the resistor 29 such that the total voltage appearing across the resistor 29 is proportional to the temperature drop across the power turbine output 16. A lead 37 is electrically connected to the potentiometer arm 28 as shown and another lead 38 is electrically connected to one side of the resistor 29 as shown. It will be observed that the voltage $V_1$ appearing across the leads 37 and 38 is proportional first of all to the magnitude of the total voltage appearing across the resistor 29 and in addition is proportional to the position of the wiper arm 28 along the resistor 29. Since the total voltage appearing across the resistor 29 is proportional to the temperature drop across the power turbine 16 and since the position of the wiper arm 28 along the resistor 29 is proportional to the magnitude of the compressor discharge pressure, the voltage $V_1$ is thus proportional to the product of the temperature drop across the turbine 16 and the compressor discharge pressure.

Now it can be shown that the power delivered by a turbine is very closely proportional to the temperature drop across the turbine multiplied by the mass flow rate of gases flowing through it. It can also be shown that in a gas turbine engine, where all or substantially all of the fluid discharged by the compressor flows through a given turbine stage, that the compressor discharge pressure level is substantially proportional to the mass flow of gas passing through that turbine stage. By pressure level, we mean either static or total pressure or a combination of both, the total pressure being substantially directly proportional to mass flow and the static pressure being substantially directly proportional to mass flow. Thus, the voltage $V_1$ which represents the product of the temperature drop across the turbine 16 and the mass flow rate of the gas passing through it, as represented by the compressor discharge pressure signal, is substantially proportional to the power developed by the turbine 16. The voltage $V_1$ may be connected to any suitable indicating instrument such as a suitably calibrated voltmeter 39 to indicate the power being developed by the power turbine 16.

In order to achieve a signal proportional to the torque being delivered by the power output turbine 16 the signal voltage $V_1$, representing the power output of the turbine, may be divided by a signal proportional to the speed of the power turbine. In the embodiment shown, we derive a signal proportional to the speed of the power turbine 16 by means of a tachometer generator 40 mounted on the gear box 20 and connected to be driven at a speed proportional to the speed of the power turbine. The output voltage of the tachometer generator 40, the magnitude of which varies in proportion to the speed of the power output turbine 16, is connected to a torque motor 41 through a pair of electrical leads 42 and 43. The torque motor 41 is of a conventional type having an armature 44, a coil 45 and a reference spring 46. The armature 44 of the torque motor is connected to control the position of a potentiometer wiper arm 47 along a resistor 48. The potentiometer wiper arm 47 is pivotally mounted at 49 as shown.

The signal voltage $V_1$ is connected across the resistor 48 through a suitably calibrated current indicating device 50. The potentiometer wiper arm 48 is electrically connected through a lead 52 to shunt out a portion of the resistance 48 such that the magnitude of the portion 48a of the resistance 48 remaining in the circuit is a function of the magnitude of the signal delivered to the torque motor coil 45 and is thus proportional to the speed of the power turbine 16. In other words, as the speed of the power turbine 16 increases, the portion 48a of resistor 48 inserted in the circuit becomes greater and as the speed decreases, the magnitude of the resistance of 48a also decreases. Now it will be observed that the magnitude of the current $I_1$ which is caused to flow through the current indicating device is determined by the voltage $V_1$ divided by the resistance of the portion 48a of resistor 48. Since the voltage $V_1$ is proportional to the power output of the turbine 16 and since the resistance of 48a is proportional to the speed of the turbine, the current $I_1$ is therefore proportional to the power divided by the speed, that is torque. Thus the magnitude of the current $I_1$ is directly proportional to the torque being developed by the power turbine 16.

It will be observed that our invention provides an arrangement whereby the torque or power output of a gas turbine engine may be measured by synthesizing a torque or power signal from certain engine operating parameters without the necessity for relying upon the torsional deflection or reaction characteristics of the output shaft or transmission.

In the embodiment of FIG. 1, the above-described torque and power sensing arrangement forms part of a control system in which the signal proportional to the engine output power is utilized as a control parameter to limit the power output to a preselected maximum level. The power limiting control of the embodiment of FIG. 1 will now be described.

As has been previously set forth, compressor discharge pressure is connected through conduits 23 and 24a and series orifice 26 to the compressor discharge pressure sensor 27. For purposes of the discussion which is to follow, the magnitude compressor discharge pressure will be represented by the symbol $P_3$. The function of the bellows 27 is normally to provide an output signal which is a function of the magnitude $P_3$ of the compressor discharge pressure.

Connected to the conduit 24a downstream of the orifice 26 is a conduit 53 which terminates in a discharge orifice 54. Flow through the orifice 54 is controlled by the position of a flapper arm 55 pivotally mounted at 56. The position of the flapper arm 55 relative to the discharge orifice 54 is controlled by a torque motor 57 comprising an armature 58, a coil 59, and a reference spring 60.

The output voltage $V_1$ of the power sensor is connected to the coil 59 of the torque motor 57 through electrical leads 61 and 62 as shown. The torque motor 57, although shown schematically, is of a conventional type in which the position of the armature 58 is determined by the magnitude of the signal imposed on the coil 59. For reasons later to be explained, a clearance or deadband X is provided between the armature 58 and the flapper 55 when the armature is in its zero excitation position. The polarity of the connection is such that as the magnitude of the voltage $V_1$ increases beyond the level required for the armature 58 to traverse the deadband X, the flapper arm 55 is picked up and moved away from the orifice 54 thereby allowing a greater flow rate through it, and as the voltage $V_1$ is decreased, the arm 55 is moved closer to the orifice to restrict the flow.

It will be observed that as the flow through the discharge orifice is reduced, the flow through the series orifice 26 is correspondingly reduced, thus causing a decrease in the pressure drop across the orifice 26. A decrease in the pressure drop across the orifice 26 increases the pressure on the downstream side of the orifice which is applied to the bellows 27. Similarly, an increase in flow through the discharge orifice 54 caused an increase in the pressure drop across the orifice 26, thereby decreasing the pressure applied to the bellows 27.

The position of the bellows output rod 27a is determined by the pressure applied to the bellows 27. It will be observed from the above-described relationships that an increase in the voltage $V_1$ causes a decrease in the pressure sensed by the bellows 27 and a decrease in the voltage $V_1$ causes an increase in the pressure sensed by the bellows 27. The foregoing effect is, of course, subject to saturating effects occurring on the one hand when the pressure drop across the orifice 26 approaches the critical ratio and on the other when the pressure drop across orifice 26 approaches zero.

It will be noted that the net effect of the above-described arrangement is to reduce the level of $P_3$ actually sensed by the bellows 27 as the power developed by the power turbine 16 increases. Now as we have pointed out above, the output position of the bellows 27 represents the input to the fuel control multiplier wherein a computed signal representing a desired fuel flow rate divided by compressor discharge pressure $P_3$ (represented as $Wf/P_3$) is multiplied by the compressor discharge pressure $P_3$ to obtain the final fuel flow signal output from the control. It will be appreciated that if the $P_3$ signal which multiplies the signal $Wf/P_3$ is smaller than the actual compressor discharge pressure, then the resulting fuel flow rate scheduled by the fuel control will be correspondingly reduced below that which would have been obtained if the full compressor discharge pressure signal had been employed.

A significant point to note here is that the conventional fuel flow limits imposed by stall and maximum temperature considerations are placed on the computed $Wf/P_3$ signal and not on the output of the bellows 27. A typical limit line is presented in FIG. 2, wherein the solid line A represents the maximum value of the $Wf/P_3$ signal which can be obtained at any given gas generator speed. The gas generator speed refers to the speed of the gas generator rotating unit comprised of the turbine 15 and the compressor 13.

The significance of the limit line A in terms of its effect on the operation of the control system may be set forth as follows, utilizing a typical helicopter control system as an example. In the typical helicopter case, as has been discussed above, the pilot sets a desired rotor speed, which corresponds to some given speed of the power turbine 16, and then controls the pitch of the main rotor blades manually. The fuel control system then acts automatically to regulate the fuel flow rate to the engine so as to maintain the preset rotor speed. For example, if the pilot increases the pitch of the rotor blades, thus increasing the load on the engine, the speed of the rotor begins to decrease, thereby producing a speed error signal in the fuel control system which increases fuel flow until the preset speed has been re-established. A speed error signal calling for an adjustment in fuel flow rate is also produced when the pilot sets the rotor speed to a new reference level.

Now it will be appreciated that in the response of the control to the speed error signals, there will be situations, arising either from abrupt changes in load or from large readjustments in the reference speed by the pilot, where the fuel flow rate called for may be so high as to either result in excessively high temperatures or produce a stall condition in the engine. To avoid such a condition, it is necessary to limit the maximum fuel flow scheduling capability of the control as a function of the air mass flow rate through the engine.

Because the control limits are scheduled as a function of gas generator speed and not mass flow, it is necessary to place the limit on the computed signal representing $Wf/P_3$ rather than on the final fuel flow output signal. This approach is necessary because $P_3$ may vary over a wide range of magnitudes for the same gas generator speed for different inlet conditions at the compressor. For example, under the higher density conditions encountered at low altitudes, $P_3$ will be substantially greater than that produced at the same gas generator speed at the higher altitudes.

Once the limited signal $Wf/P_3$ is obtained, it is then multiplied by the $P_3$ signal to produce the output signal of the control which schedules the fuel flow rate $Wf$. It will therefore be apparent that if a given computed $Wf/P_3$ signal is multiplied by a smaller $P_3$, the resultant fuel flow scheduled by the control will be correspondingly smaller. The effect thus produced is equivalent to that which would be obtained if the limit line A were lowered to a position such as illustrated by the dotted line B.

It will be observed that this is the result produced by the control illustrated in FIG. 1, wherein the magnitude of the $P_3$ signal delivered to the control system multiplier is modified as a function of the power developed by the power turbine 16. This effect is produced, however, only when the magnitude of $V_1$ exceeds the level required to traverse the deadband X. In other words, the deadband X determines the reference level of engine output power above which the modification of the sensed $P_3$ signal will occur.

Therefore, as has just been described, the arrangement is such that the power signal voltage $V_1$ produces no effect on the magnitude of the compressor discharge pressure $P_3$ sensing bellows 27 so long as $V_1$ represents a power output level below that at which the limiting action is desired. However, when the critical level corresponding to the preselected maximum power limit is reached, the torque motor armature 58 contacts the flapper arm 55 and begins to move it away from the discharge nozzle 54 and thereby reduce the pressure downstream of the orifice 26. As has been explained above, the magnitude of the $P_3$ signal delivered to the main fuel control multiplier is thus correspondingly reduced.

This means that when the $Wf/P_3$ signal computed by the control system is multiplied by the reduced $P_3$ signal, the fuel flow rate actually scheduled by the control will be smaller than would otherwise be the case. In effect, this is equivalent to lowering the control limit line A to a new position below the original line A such as represented by the dotted line B.

Thus, the system is provided with the capability of modifying the fuel flow limit characteristics of the control system in response to the power output signal. To give an example of how the system operates to achieve power limiting, consider the engine operating at some point D corresponding to a given gas generator speed and a computed $Wf/P_3$ level below the limit line A. Assume that the point D falls within the category wherein the maximum desired power output of the engine may be exceeded without encountering the fuel flow limits represented by the line A, and assume further that the controls are manipulated in such a manner as to cause the power output signal $V_1$ to exceed the preselected reference level.

This causes the armature 58 of the torque motor to pick up the flapper arm 55 and move it way from the discharge nozzle 54, thereby reducing the pressure sensed by the $P_3$ sensor 27. As pointed out above, a reduction in the magnitude of the $P_3$ signal sensed by the $P_3$ sensor 27 reduces the fuel flow rate scheduled by the control for each $Wf/P_3$ signal and thus produces an effect which may be represented by a reduction in the $Wf/P_3$ limits.

For purposes of the example being presented, assume that the equivalent reduction in the $Wf/P_3$ limit line produces a new limit line which falls below the operating point D, such that the resulting reduction in fuel flow causes the gas generator speed to be reduced. Thus, the operating point D is moved downward and to the left along a path represented by E until it reaches a new operating point F which does not require a fuel flow rate in excess of that imposed by the new limit line represented by the dotted line B.

It will be appreciated by those skilled in the art that since the operating point F and the limit line B together represent an equilibrium position, the power limit control must generate a continuous power error signal of sufficient magnitude to hold the limit line in the position represented by the line B. This is equivalent to a so-called droop type of control wherein the continued generation of a corrective signal requires the continuous existence of an error signal. The amount of droop, or in this case the magnitude of the power error signal required to produce the maximum required adjustment in the fuel flow limit line, is determined by the gain of the control. For example, one system might produce the maximum required adjustment for a power error signal of 2% in excess of the reference, while a second system with twice the gain would be capable of producing the same adjustment with an error signal of only 1% of the reference level.

With the type of control illustrated therefore, the reference power level at which the armature 58 picks up the flapper arm 55, and above which the limiting action begins to occur, must be set slightly lower than the maximum desired output power level, since a power level slightly in excess of the reference level must be developed to produce the limiting action.

It will be appreciated by those skilled in the art, however, that the proportional characteristic of the control may be eliminated in various ways. For example, an integrating element may be placed in the system downstream of the point where the error signal is generated, thus imposing the requirement that the error signal must always return to zero in the steady state condition. With such a system, the reference power setting is exceeded only during system transients.

Referring now to FIG. 3, we have shown the limiter portion of the control of FIG. 1 connected to be actuated by the engine output torque signal rather than the output power signal as in FIG. 1. The elements shown in the arrangement are the same as those illustrated in FIG. 1 and are designated by like numerals. In this arrangement, the torque motor coil is connected in series, with the lead 38a so as to be energized by the current $I_1$, which is proportional to the engine output torque. Here also, as in the arrangement of FIG. 1, the position of the armature 58 is proportional to the magnitude of the excitation current and a deadband Y is provided such that the armature 58 does not pick up the flapper arm 55 until a preselected excitation level corresponding to the reference output torque level is reached. In other words for values of $I_1$, corresponding to output torques which are less than the preselected level at which limiting is desired to occur, the armature 58 occupies a position somewhere in the deadband Y and when $I_1$ exceeds the reference level, the armature 58 picks up the flapper arm 55 and limiting action begins to occur in the same manner as that described above in connection with the arrangement of FIG. 1.

Thus in the arrangement of FIG. 3, the torque output of the power turbine 16 is limited to any preselected level depending on the magnitude Y of the deadband setting. It will be appreciated that the arrangements of FIGS. 1 and 2 may be connected to operate simultaneously to limit both output torque and output power to preselected levels. For example, this may be accomplished by connecting another conduit 53a on the downstream side of the orifice 26 as shown in FIG. 3 and controlling the flow through this conduit as a function of output power by means of the arrangement shown in FIG. 1. With such an arrangement, limiting occurs if either the output torque or the output power exceeds its respective reference level. In addition, visual monitoring of engine output torque and output power may be achieved by monitoring the magnitudes of the current I and the voltage V through suitably calibrated instruments 39 and 50.

Thus we have provided a torque and power sensing and control system which provides for either manual or automatic control of these parameters without the necessity for direct access to the torque transmitting elements of the engine or its output transmission and which is not affected by variations in the characteristics of these elements. In addition, the system can be installed with a minimum of modification to the basic engine structure.

It should be appreciated that various modifications may be made in the arrangements presented. For example, the speed sensitive signal produced by the tachometer generator 40 may be extracted in other ways. Since it is usually necessary in the control of engines of this type to generate a signal proportional to the speed of the power turbine 16, this mechanism could be utilized to provide the speed input signal for the system shown in FIG. 1. In addition, other methods of introducing the torque and power signals into the main control to achieve control system sensitivity to these parameters will occur to those skilled in the art. It will also be apparent that the compressor discharge pressure and the temperature drop across the power turbine may be sensed in ways other than that shown. It will also be recognized that while we sense the compressor discharge pressure as a measure of mass flow, the static or total pressure or a combination of both may be sensed at other points along the compressor to derive a signal proportional to mass flow.

Thus, while we have described several embodiments of our invention for purposes of making a disclosure thereof, it should be appreciated that these descriptions are not limiting in nature and that various modifications, substitutions, and changes may be made in the arrangements presented without departing from the true scope and spirit of our invention as defined in the appended claims.

What we claim as new and desire to secure by Letters Patent of the United States is:

1. Means for sensing the power developed by the power turbine of a gas turbine engine comprising means producing a first signal proportional to the gas temperature drop across said power turbine, means producing a second signal proportional to the mass flow rate of gas through said power turbine, and means producing a third signal proportional to the product of said first and second signals.

2. Means for sensing the torque developed by the power turbine of a gas turbine engine comprising means producing a first signal proportional to the gas temperature drop across said power turbine, means producing a second signal proportional to the mass flow rate of gas through said power turbine, means producing a third signal proportional to the speed of said power turbine, and means producing a fourth signal proportional to the product of said first and second signals divided by said third signal.

3. In a gas turbine engine having a compressor in series fluid flow relationship with a power output turbine, means for sensing the power developed by said power output turbine comprising means producing a first signal proportional to the fluid pressure in said compressor, means producing a second signal proportional to the gas temperature drop across said power output turbine, and means producing a third signal proportional to the product of said first and second signals.

4. In a gas turbine engine having a compressor in series fluid flow relationship with a power output turbine, means for sensing the torque developed by said power output turbine comprising means producing a first signal proportional to the fluid pressure in said compressor, means producing a second signal proportional to the gas temperature drop across said power output turbine, means producing a third signal proportional to the speed of said power output turbine, and means producing a fourth signal proportional to the product of said first and second signals divided by said third signal.

5. A control system for a gas turbine having a power output turbine comprising means producing a first signal proportional to the gas temperature drop across said power output turbine, means producing a second signal proportional to the mass flow rate of gas through said power output turbine, means producing a third signal proportional to the product of said first and second signals, and means limiting the fuel flow rate to said engine when the magnitude of said third signal is greater than a preselected level.

6. A control system as set forth in claim 5 in which said fuel flow rate limiting means comprises means responsive to the magnitude of said third signal in excess of said preselected level for modifying the magnitude of the compressor discharge pressure sensed by the main fuel control system of said engine.

7. A control system for a gas turbine engine having a power output turbine comprising means producing a first signal proportional to the gas temperature drop across said power output turbine, means producing a second signal proportional to the mass flow rate of gas through said power output turbine, means producing a third signal proportional to the speed of said power output turbine, means producing a fourth signal proportional to the product of said first and second signals divided by said third signal, and means limiting the fuel flow rate to said engine when the magnitude of said fourth signal exceeds a preselected level.

8. A control system as set forth in claim 7 in which said fuel flow rate limiting means comprises means responsive to the magnitude of said fourth signal in excess of said preselected level for modifying the magnitude of the compressor discharge pressure sensed by the main fuel control system of said engine.

9. Control means for limiting the power output of a gas turbine engine of the type having a compressor in series fluid relationship with a free power output turbine comprising means for sensing the gas temperature drop across said free power turbine, means for sensing the fluid pressure in said compressor, means producing a signal proportional to the product of said gas temperature drop and said compressor pressure, and means for limiting the fuel flow rate to said engine as a function of said signal when the magnitude of said signal exceeds a preselected level.

10. Control means as set forth in claim 9 in which said fuel flow rate limiting means comprises means for modifying the magnitude of the compressor discharge pressure signal delivered to the main fuel control system of said engine.

11. Control means for limiting the torque output of a gas turbine engine of the type having a compressor in series fluid flow relationship with a free power output turbine comprising means for sensing the gas flow temperature drop across said free power turbine, means for sensing the fluid pressure in said compressor, means for sensing the speed of said free power turbine, means producing a signal proportional to the product of said gas temperature drop and said compressor pressure divided by the speed of said free power turbine, and means for limiting the fuel flow rate to said engine as a function of said signal when the magnitude of said signal exceeds a preselected level.

12. Control means as set forth in claim 11 in which said fuel flow rate limiting means comprises means for modifying the magnitude of the compressor discharge signal delivered to the main fuel control system of said engine.

13. For use with a gas turbine engine having a compressor, a compressor turbine and a power turbine, means for indicating the instantaneous value of engine torque comprising means producing a first signal proportional to rotational speed of the power turbine, means producing a second signal proportional to the product of the temperature drop across the power turbine times a compressor generated pressure, means for dividing said second signal by said first signal to produce a third signal proportional to engine torque, and indicating means responsive to said third signal.

14. For use with a gas turbine engine having a compressor, a compressor turbine and a power turbine, a torque control comprising means producing a first signal proportional to rotational speed of the power turbine, means producing a second signal proportional to the product of the temperature drop across the power turbine times a compressor generated pressure, means for dividing said second signal by said first signal to produce a third signal proportional to engine torque, means producing a torque reference signal and comparing said signal proportional to engine torque with said reference signal to produce a torque error signal, motor means responsive to said torque error signal, and valve means operatively connected to said motor means effective to vary the fuel to said engine with changes in said torque error signal.

No references cited.